Feb. 2, 1960
R. A. COLLINS
2,923,273
FARROWING ENCLOSURE
Filed Dec. 3, 1958
3 Sheets-Sheet 1
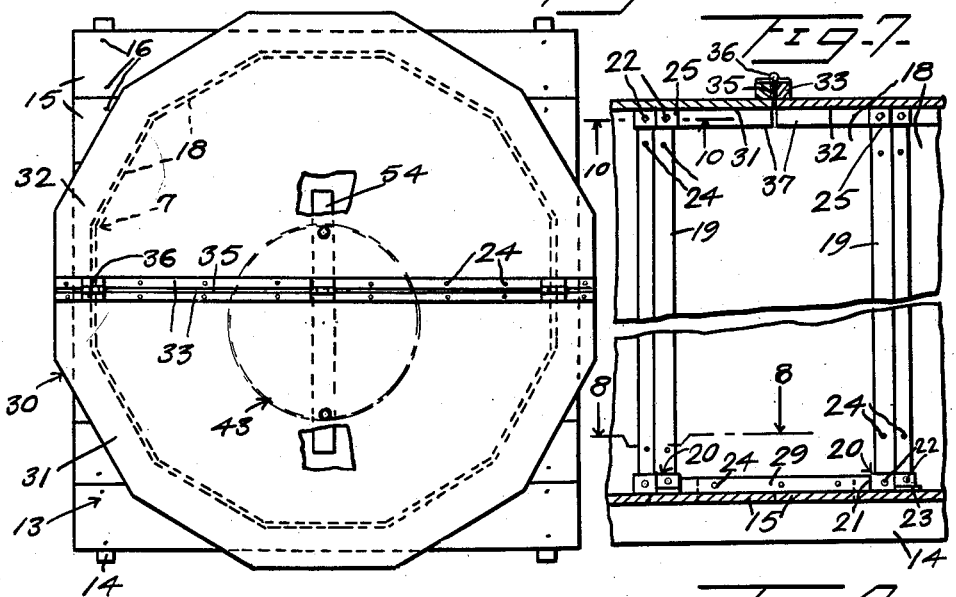
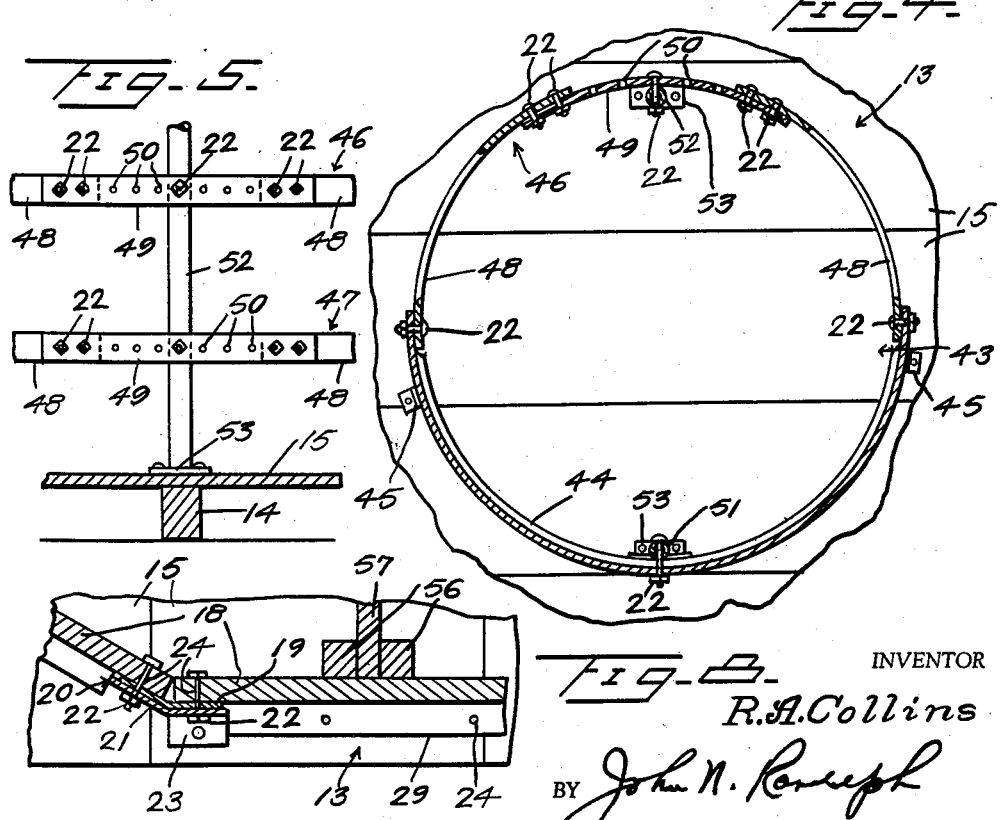
INVENTOR
R. A. Collins
BY John N. Randolph
ATTORNEY

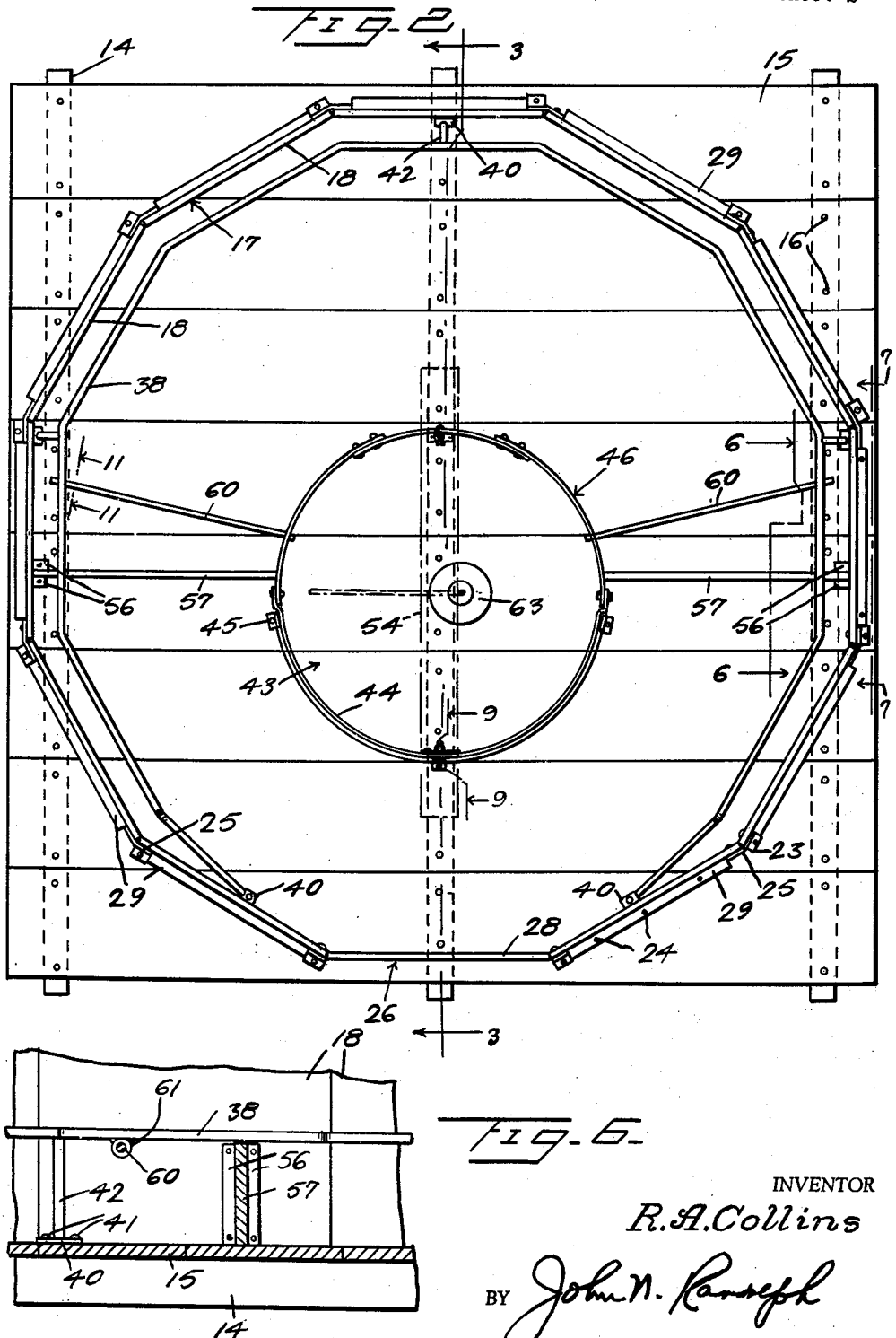

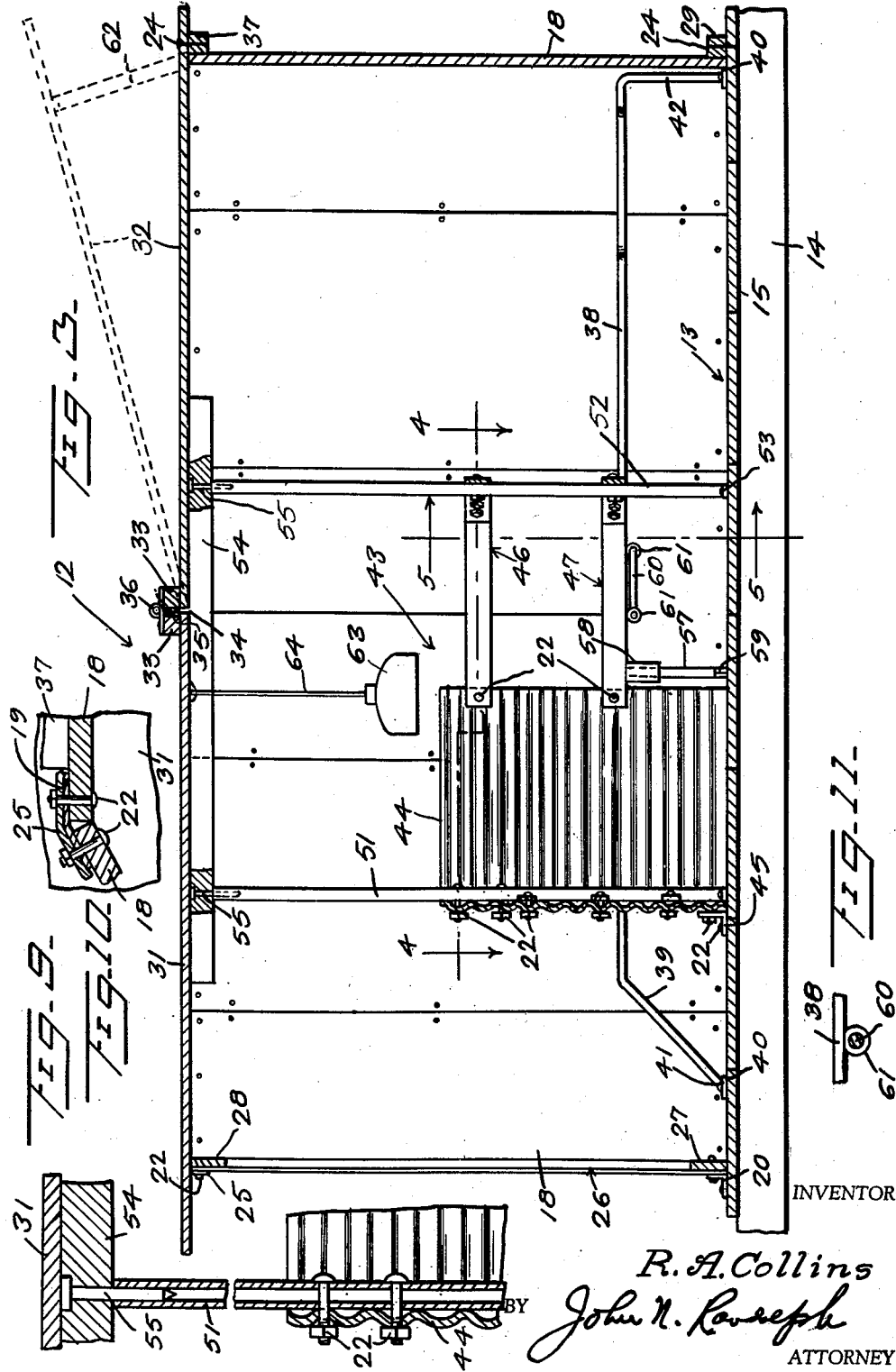

United States Patent Office 2,923,273
Patented Feb. 2, 1960

2,923,273

FARROWING ENCLOSURE

Robert A. Collins, Waukon, Iowa, assignor to Pigloo Corporation, a corporation of Iowa Application December 3, 1958, Serial No. 777,994

10 Claims. (Cl. 119—20)

This invention relates to a novel farrowing enclosure or brooder for pigs and has for its primary object to provide an enclosure which will afford a dry protective shelter for young pigs, so constructed that the sow may lie only in a position within the enclosure in which the body of the sow is disposed so that a litter of newborn pigs may readily nurse from a protected position within a hover area of the enclosure or within a protected area adjacent thereto.

Another object of the invention is to provide a farrowing enclosure which will be maintained dry and warm in cold weather or which may be kept relatively cool in hot weather.

Still another object of the invention is to provide an enclosure including a novel construction of hover which may be adjusted in size for accommodating normal or large size sows.

A further object of the invention is to provide a farrowing enclosure including novel means to prevent baby pigs from moving out of the enclosure but permitting movement of the baby pigs within a limited area within the enclosure and beyond the confines of the hover area, without risk of being injured by the sow.

Various other objects and advantages of the invention will hereinafter become more fully apparent from the following description of the drawings, illustrating a presently preferred embodiment thereof, and wherein:

Figure 1 is a top plan view, partly broken away, of the farrowing enclosure;

Figure 2 is an enlarged top plan view thereof with the roof removed and with certain other parts omitted;

Figure 3 is an enlarged fragmentary vertical sectional view of the enclosure, taken substantially along the line 3—3 of Figure 2, and showing the roof applied;

Figure 4 is a fragmentary horizontal sectional view taken substantially along the line 4—4 of Figure 3;

Figure 5 is a fragmentary vertical sectional view taken substantially along a plane as indicated by the line 5—5 of Figure 3;

Figure 6 is an enlarged fragmentary vertical sectional view, taken substantially along the line 6—6 of Figure 2;

Figure 7 is a fragmentary vertical sectional view of the enclosure, taken substantially along the line 7—7 of Figure 2, showing the roof applied;

Figure 8 is an enlarged fragmentary horizontal sectional view, taken substantially along the line 8—8 of Figure 7;

Figure 9 is an enlarged fragmentary vertical sectional view, taken substantially along the line 9—9 of Figure 2;

Figure 10 is an enlarged fragmentary horizontal sectional view, taken substantially along the line 10—10 of Figure 7, and Figure 11 is an enlarged detailed sectional view, taken substantially along the line 11—11 of Figure 2.

Referring more specifically to the drawings, the farrowing enclosure in its entirety is designated generally 12 and includes a floor preferably formed of wood and designated 13. The floor 13 is formed of spaced parallel sills 14 and boards 15 which are secured to the upper surfaces of the sills 14 by suitable fastenings such as nails 16.

The enclosure 12 includes a wall, designated generally 17, which is preferably composed of a plurality of upright panels 18 which are supported by and rise from the floor 13. The panels 18 are likewise preferably formed of wood, and may be composed of plywood. The vertical edges of the panels 18 are preferably reinforced by metal strips or battens 19. The adjacent edges of adjacent panels 18 are connected together at the bottoms thereof by anchoring brackets 20, as best seen in Figures 7 and 8, each including a strap portion 21 of angular shape which is secured to the outer sides of the lower portions of the panels 18 by fastenings 22, comprising nut and bolt fastenings, the nuts of which are disposed on the outer sides of the straps 21 and externally of the panels 18. Each of said bottom brackets 20 includes an outturned bottom anchoring portion 23 which is secured to the upper surface of the floor 13 by an additional fastening 22. The battens 19 are secured in place by driven fastenings such as small nails 24. The panels 18 are connected together at their upper ends in a like manner by rigid angular strap members 25 which are secured to the upper corners of the two panels 18 by nut and bolt fastenings 22, and are also disposed on the outer sides of said panels. The strap members 25 do not include an outturned extension similar to the extension 23.

The wall 17 is preferably twelve sided, as seen in Figure 2, so that said wall is nearly circular. The wall 17 is composed of eleven panels 18 with a space between two of said panels 18 forming an open doorway 26, as best seen in Figure 3. A bottom strip 27 extends between the adjacent edges of the panels 18, defining the doorway 26, and a top strip 28 is disposed between the upper ends of said panels 18. The ends of the bottom strip 27 are connected to said panels 18 and to the floor 13 by anchoring brackets 20, and the ends of the upper bracing strip 28 are connected to the upper corners of said panels 18 by strap members 25. Cleats 29 are secured to the floor 13 along the bottom edges of the outer sides of the panels 18 by additional driven fastenings 24 for cooperating with the battens 19 for sealing and reinforcing the wall panels 18.

A roof, designated generally 30, preferably of the same shape as the wall 17 but of somewhat larger size, as seen in Figures 1 and 3, is likewise formed of plywood and includes two corresponding roof halves 31 and 32. Cleats 33 are secured, as by additional driven fastenings 24, to the upper sides of the roof halves 31 along the straight adjacent edges 34 thereof, and a sealing strip 35 is disposed between said cleats 33. The sealing strip 35 may be formed of rubber and may be folded lengthwise with the fold edge at the top and the two depending walls secured to the two cleats 33 in any suitable manner, for sealing the joint between the roof halves. Conventional hinges 36 are secured to the upper faces of the cleats 33 for hingedly connecting the roof sections to one another. As best illustrated in Figures 3, 7 and 10, cleats 37 are secured by driven fastenings 24 to the undersides of the overhanging portions of the roof sections 31 and 32 and engage against the outer sides of the upper portions of the panels 18, between the strap members 25.

A guard rail 38 is disposed around a substantial part of the inner side of the wall 17 and is spaced inwardly therefrom. The guard rail 38 has downturned ends 39 terminating in feet 40 which rest on and are secured by fastenings 41 to the floor 13, against the two front panels 18, between which the doorway 26 is disposed. The remainder of the guard rail 38 is supported at longitudinally spaced points by outwardly and downwardly extending legs 42 which also have foot members 40 at the lower ends thereof resting on and secured to the floor 13 by additional fastenings 41 and also abutting the inner sides of certain of the other panels 18, for supporting the guard rail above and spaced from the floor 13 and also spaced inwardly from the wall 17.

A hover, designated generally 43, includes an upright substantially semicircular wall 44, which may be formed of corrugated metal and which is secured at its bottom edge to the floor 13 by angle brackets 45 and fastenings 22. The ends of a top strap member 46 and a bottom strap member 47 are secured by fastenings 22 to the two ends of the wall 44, said strap members forming a substantially semicircular rear half of the hover 43. As best seen in Figure 4, each strap member 46 and 47 is formed of end sections 48 which are secured to and extend from the ends of the wall 44 and an intermediate section 49 which is connected at its ends by nut and bolt fastenings 22 in overlapping relation to the adjacent ends of the strap sections 48. As best seen in Figures 4 and 5, the intermediate strap sections 49 have a series of spaced openings 50 for selectively receiving the fastenings 22 to vary the extent that the ends of the sections 49 overlap the sections 48, to thus vary the arc formed by the strap members 46 and 47 and the radius of said rear half of the hover 43.

A front post 51 is fixed to and extends upwardly from the floor 13 and is secured by fastenings 22 to the inner side of the intermediate portion of the hover wall 44, and a rear post 52 is supported by and extends upwardly from the floor 13 and is secured by fastenings 22 to the sections 49 of the straps 46 and 47. Said posts have foot members or bases 53 at their lower ends which rest upon and are secured to the floor 13. The posts 51 and 52 are preferably rigid pipes or tubes and extend to substantially above the top of the hover 43 and support a bar 54 on the upper ends thereof. Spikes 55 extend downwardly through the bar 54 into the upper ends of the posts 51 and 52 for attaching said supporting bar 54 to said posts. The bar 54 provides a support for the central portion of the roof 30 and is disposed crosswise of the axis of the hinges 36.

As best illustrated in Figures 2 and 3, the hover 43 is located nearer the doorway 26 than the back of the enclosure, and the solid wall portion 44 thereof is disposed adjacent the doorway 26.

Pairs of cleats 56 are secured to the lower portions of the side panels 18 to form vertical slots or guideways therebetween and in each of which is received the outer end of a board 57. Said boards 57 extend inwardly to the hover 43 and have inner ends abutting against stop members 58 which are fixed to and extend downwardly from the lower strap member 47, adjacent the ends of the wall member 44, as seen in Figure 3. Nails or other stops 59 are anchored in and extend upwardly from the floor 13 and abut against the inner ends of the boards 57 for rigidly positioning said boards between the sides of the wall 17 and the hover 43. Rods 60 extend between the strap member 47 and the guard rail 38 and are supported adjacent their ends in eyes 61 which are fixed to and depend from said parts 38 and 47, as seen in Figure 3. The rods 60 are disposed adjacent to but rearwardly of the boards 57 and form back-up rods, for a purpose which will hereinafter become apparent.

The solid front half of the hover 43, formed by the semicircular wall member 44, faces toward the doorway 26 and is disposed in sufficiently close proximity to the front part of the enclosure wall 17 so that while a sow can enter the enclosure through the doorway 26 and move around to the back of the enclosure, the sow cannot conveniently lie down between the front part of the enclosure wall and the front hover portion 44. The area between the open rear half of the hover and the rear part of the enclosure wall 17 or the guard rail 38, is of sufficient width to permit the sow to conveniently lie down. However, since the guard rail and hover wall are nearly circular, the sow can only lie down with her back toward the guard rail, in which position the belly of the sow is exposed to newly born pigs within the hover 43, so that newly born pigs can nurse the sow without risk of being stepped upon or otherwise crushed. The straps 46 and 47, forming the open rear half of the hover 43, provide access for the newborn pigs to nurse from within the hover area. The solid wall portion 44 will protect the hover interior from cold drafts entering through the doorway 26, and the boards 57 form additional shields for this purpose. Further, the boards 57, which preferably extend to about seven inches above the level of the floor 13, will prevent young pigs leaving the enclosure 12 or reaching positions in the forward part of the enclosure where the young pigs would be subject to cold drafts. The back-up rods 60 prevent the sow from backing up against the boards or shield 57 and thus provide passageways between said boards and the adjacent back-up rods through which the young pigs can move in safety to and from the hover 43 and so that the young pigs can move about beneath the guard rail 38 and thus around the rear half of the enclosure 12 without risk of being injured by the sow.

As previously described, the rear post 52 can be moved inwardly or forwardly of the hover and the strap members 46 and 47 may be drawn inwardly, by adjustment of the fastenings 22 thereof into other of the openings 50, to reduce the size of the rear half of the hover and to thus increase the space between said rear half of the hover and the guard rail 38 to accommodate abnormally large sows.

The wood construction of the floor 13, wall 17 and roof 30 provides a warm, dry enclosure for the sow and young pigs. In addition, moist damp air from the pigs will rise to the roof 30 and will escape through the open doorway 26, which is open substantially to the roof, for maintaining the interior of the enclosure 12 dry and warm during cold weather.

In hot weather, the temperature within the enclosure 12 can be maintained considerably lower than the temperature of the surrounding atmosphere by raising the rear half 32 of the roof, as illustrated in dotted lines in Figure 3. Said rear roof half 32 may be maintained in its open dotted line position in any suitable manner, as by means of a brace or prop 62, placed between said roof half, and a part of the upper edge of the wall 17. With the rear roof half thus raised, circulation of air will be provided through the enclosure 12, either inwardly through the open roof half and outwardly through the doorway 26, disposed remote from the roof opening, or inwardly through the doorway and outwardly through the opening provided by the rear part of the roof.

An electric heating lamp 63 or other suitable electric heating means may be suspended from above the hover 43 by an electric cord 64, a part of which is suitably connected to and depends from the supporting bar 54, for heating the hover area during cold weather.

Various modifications and changes are contemplated and may be resorted to, without departing from the function or scope of the invention as hereinafter defined by the appended claims.

I claim as my invention:

1. A farrowing enclosure comprising an enclosure floor formed of wood, a substantially circular upright enclosure wall fixed to and extending upwardly from the floor and having an opening therein forming a doorway, a substantially flat roof supported on the upper edge of said upright wall and normally closing the top of said enclosure, said doorway opening extending to substantially the roof, a substantially circular hover disposed within said enclosure and supported on and rising from the floor, including a solid front half facing toward and disposed adjacent said doorway and an open rear half facing away from the doorway, said hover being disposed with its center nearer said doorway than the rear portion of the wall, disposed opposite the doorway, substantially semi-circular rigid vertically spaced strap members having ends secured to said front half of the hover and constituting the rear half thereof, the open top of said hover being disposed substantially below the level of the roof, a guard rail disposed around the inner side of the rear half of said upright wall and spaced inwardly from said wall and supported by and disposed above the floor, and means extending between one of said strap members and portions of said guard rail and disposed adjacent the ends of said front half of the hover and forming a restricted passage between the interior of the hover and the part of the enclosure disposed beneath said guard rail, said means cooperating with the solid front half of the enclosure to restrict young pigs to the rear part only of the enclosure and the area disposed within said hover.

2. A farrowing enclosure as in claim 1, said means including boards extending between the hover and parts of said upright wall, and rods extending between and supported by portions of the guard rail and parts of said aforementioned strap member, said rods and the upper edges of said boards being disposed at a level beneath and adjacent the level of said guard rail, said rods being spaced rearwardly from said boards and combining therewith to provide the passageway between the interior of the hover and the area of the enclosure disposed beneath the guard rail.

3. A farrowing enclosure as in claim 1, and means for adjusting the radius of the arc of the open rear half of said hover as defined by said strap members for varying the space between said open rear half of the hover and the surrounding portions of said upright wall and guard rail.

4. A farrowing enclosure as in claim 1, said roof including a front half and a rear half hingedly connected to said front half, said rear roof half being raised to provide an air circulation opening between a rear half of the upper edge of said upstanding wall and said rear roof half for the circulation of air therethrough and through the enclosure and doorway.

5. A farrowing enclosure as in claim 1, said upright wall comprising a plurality of upright wood panels, fastening means adjustably securing said panels to one another and to the floor for positioning the panels to form the substantially circular upright wall and for sealing the joints between adjacent edges of the panels.

6. A farrowing enclosure as in claim 5, two adjacently disposed panels of said wall being spaced from one another to form said open doorway.

7. A farrowing enclosure as in claim 1, posts fixed to and rising from said floor and secured to and providing supports for said hover halves, said posts having upper ends terminating substantially above the open top of said hover, a roof supporting beam, and means detachably connecting said beam to the upper ends of said posts for positioning said beam beneath and in a position to support the central portion of said roof.

8. A farrowing enclosure comprising, in combination with a substantially circular walled enclosure including a floor, a roof, an upright substantially circular wall extending between the floor and roof and having an opening extending from adjacent the floor to adjacent the roof and forming an open doorway of the enclosure, a hover fixedly mounted in the enclosure and extending upwardly from the floor thereof including a solid front half disposed adjacent the doorway and a rear half of openwork construction, a guard rail supported by and disposed above the floor and spaced inwardly from said wall and surrounding said rear half of the hover, boards extending from the ends of the solid front half of the hover to the circular wall and having bottom edges resting on the floor, means detachably fastening the boards to the hover and wall, said boards having upper edges disposed in close proximity to the floor and below the level of the guard rail, said boards cooperating with said front half of the hover for confining young pigs only to the rear half of the enclosure.

9. A farrowing enclosure as in claim 8, said roof being substantially flat and including a hinged rear half, means for supporting said rear roof half in an upwardly and rearwardly inclined open position to provide for free circulation of air therethrough and through the enclosure and doorway.

10. A farrowing enclosure as in claim 8, rods extending between the guard rail and rear half of the hover, means detachably connecting the rods to the guard rail and hover, said rods being disposed at approximately the level of the upper edges of the boards and behind and adjacent said boards to combine therewith to provide protective passages between the interior of the hover and a portion of the enclosure disposed beneath said guard rail.

References Cited in the file of this patent

UNITED STATES PATENTS

| | | |
|---|---|---|
| 1,744,692 | Wessel | Jan. 21, 1930 |
| 2,740,379 | Collins | Apr. 3, 1956 |